United States Patent [19]

Sfarti et al.

[11] Patent Number: 4,912,658

[45] Date of Patent: Mar. 27, 1990

[54] METHOD AND APPARATUS FOR ADDRESSING VIDEO RAMS AND REFRESHING A VIDEO MONITOR WITH A VARIABLE RESOLUTION

[75] Inventors: Adrian Sfarti, Sunnyvale; Achim Strupat, Irvine, both of Calif.

[73] Assignee: Advanced Micro Devices, Inc., Sunnyvale, Calif.

[21] Appl. No.: 853,586

[22] Filed: Apr. 18, 1986

[51] Int. Cl.[4] ........................ G06F 3/153; G06F 15/62

[52] U.S. Cl. ..................................... 364/521; 364/518; 364/900; 340/747; 340/750

[58] Field of Search ........ 364/521, 518, 522, 200 MS, 364/900 MS; 340/750, 799, 798, 747

[56] References Cited

U.S. PATENT DOCUMENTS

| | | | |
|---|---|---|---|
| 4,564,915 | 1/1986 | Evans et al. | 364/521 |
| 4,580,135 | 4/1986 | Kummer et al. | 340/750 |
| 4,620,186 | 10/1986 | Krause et al. | 340/703 |
| 4,622,547 | 11/1986 | Furukawa et al. | 340/750 |
| 4,631,531 | 12/1986 | Maeda | 340/701 |
| 4,644,502 | 2/1987 | Kawashima | 365/219 |
| 4,646,262 | 2/1987 | Smith | 364/900 |
| 4,653,012 | 3/1987 | Duffy et al. | 364/518 |
| 4,663,619 | 5/1987 | Staggs et al. | 340/750 |
| 4,663,729 | 5/1987 | Matick et al. | 364/900 |
| 4,667,305 | 5/1987 | Dill et al. | 364/900 |
| 4,691,295 | 9/1987 | Erwin et al. | 364/900 |
| 4,695,967 | 9/1987 | Kodama et al. | 364/521 |
| 4,745,407 | 5/1988 | Cosletto | 340/799 |
| 4,747,042 | 5/1988 | Ishii et al. | 364/200 |
| 4,773,026 | 9/1988 | Takahara et al. | 364/518 |
| 4,773,044 | 9/1988 | Starfi et al. | 364/518 |
| 4,780,713 | 10/1988 | Lundström | 340/750 |

*Primary Examiner*—Gary V. Harkcom

*Assistant Examiner*—Phu K. Nguyen

*Attorney, Agent, or Firm*—Fliesler, Dubb, Meyer & Lovejoy

[57] ABSTRACT

A graphics controller having the capacity for translating X and Y logical addresses of words in a bit map into corresponding physical row and column addresses of words in a plurality of memory chips, for addressing selected bits within a word and for refreshing a video monitor with and without window segments beginning and ending with bits located inside word boundaries.

20 Claims, 10 Drawing Sheets

FIG. 3
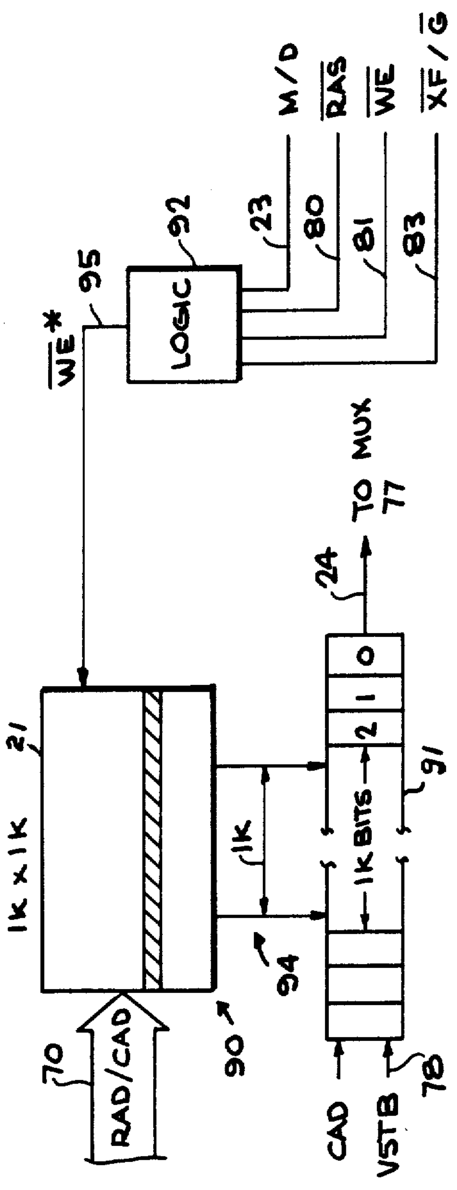
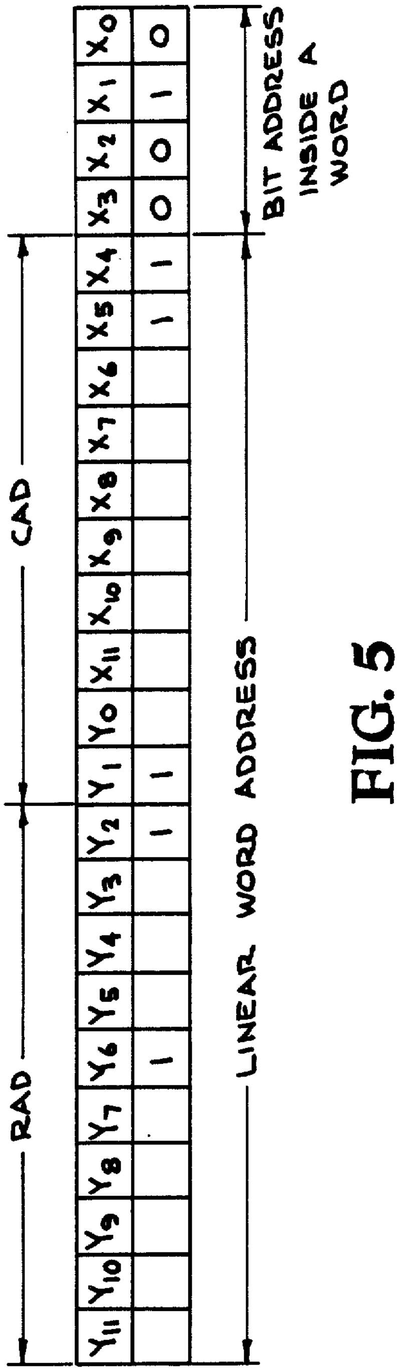
FIG. 5

<table>
<tr><td rowspan="2">Y=70=64+4+2</td><td>$Y_{11}$</td><td>$Y_{10}$</td><td>$Y_9$</td><td>$Y_8$</td><td>$Y_7$</td><td>$Y_6$</td><td>$Y_5$</td><td>$Y_4$</td><td>$Y_3$</td><td>$Y_2$</td><td>$Y_1$</td><td>$Y_0$</td></tr>
<tr><td>0</td><td>0</td><td>0</td><td>0</td><td>0</td><td>1</td><td>0</td><td>0</td><td>0</td><td>1</td><td>1</td><td>0</td></tr>
<tr><td rowspan="2">X=50=32+16+2</td><td>$X_{11}$</td><td>$X_{10}$</td><td>$X_9$</td><td>$X_8$</td><td>$X_7$</td><td>$X_6$</td><td>$X_5$</td><td>$X_4$</td><td>$X_3$</td><td>$X_2$</td><td>$X_1$</td><td>$X_0$</td></tr>
<tr><td>0</td><td>0</td><td>0</td><td>0</td><td>0</td><td>0</td><td>1</td><td>1</td><td>0</td><td>0</td><td>1</td><td>0</td></tr>
</table>

FIG. 6

| | $A_{11}$ | $A_{10}$ | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|---|---|
| RAD | X | X | $Y_9$ | $Y_8$ | $Y_7$ | $Y_6$ | $Y_5$ | $Y_4$ | $Y_3$ | $Y_2$ | $Y_1$ | $Y_0$ |
| CAD | X | X | $Y_{11}$ | $Y_{10}$ | $X_{11}$ | $X_{10}$ | $X_9$ | $X_8$ | $X_7$ | $X_6$ | $X_5$ | $X_4$ |

FIG. 7

<table>
<tr><td></td><td>$A_{11}$</td><td>$A_{10}$</td><td>$A_9$</td><td>$A_8$</td><td>$A_7$</td><td>$A_6$</td><td>$A_5$</td><td>$A_4$</td><td>$A_3$</td><td>$A_2$</td><td>$A_1$</td><td>$A_0$</td></tr>
<tr><td>RAD</td><td rowspan="2">X</td><td rowspan="2">$Y_{11}$</td><td rowspan="2">$Y_{10}$</td><td>$Y_8$</td><td>$Y_7$</td><td>$Y_6$</td><td>$Y_5$</td><td>$Y_4$</td><td>$Y_3$</td><td>$Y_2$</td><td>$Y_1$</td><td>$Y_0$</td></tr>
<tr><td>CAD</td><td>$Y_9$</td><td>$X_{11}$</td><td>$X_{10}$</td><td>$X_9$</td><td>$X_8$</td><td>$X_7$</td><td>$X_6$</td><td>$X_5$</td><td>$X_4$</td></tr>
</table>

FIG. 8

<table>
<tr><td></td><td>$A_{11}$</td><td>$A_{10}$</td><td>$A_9$</td><td>$A_8$</td><td>$A_7$</td><td>$A_6$</td><td>$A_5$</td><td>$A_4$</td><td>$A_3$</td><td>$A_2$</td><td>$A_1$</td><td>$A_0$</td></tr>
<tr><td>RAD</td><td rowspan="2">$Y_{11}$</td><td rowspan="2">$Y_{10}$</td><td rowspan="2">$Y_9$</td><td rowspan="2">$Y_8$</td><td>$Y_7$</td><td>$Y_6$</td><td>$Y_5$</td><td>$Y_4$</td><td>$Y_3$</td><td>$Y_2$</td><td>$Y_1$</td><td>$Y_0$</td></tr>
<tr><td>CAD</td><td>$X_{11}$</td><td>$X_{10}$</td><td>$X_9$</td><td>$X_8$</td><td>$X_7$</td><td>$X_6$</td><td>$X_5$</td><td>$X_4$</td></tr>
</table>

FIG. 9

METHOD AND APPARATUS FOR ADDRESSING VIDEO RAMS AND REFRESHING A VIDEO MONITOR WITH A VARIABLE RESOLUTION

BACKGROUND OF THE INVENTION

1. Field of the Invention

The present invention relates to graphics controllers in general and in particular to a method and apparatus comprising a graphics controller having the capacity for translating X and Y array addresses of words in a bit map into corresponding physical row and column addresses of the words in memory chips without the need for an intermediate linear address, for selectively addressing either 16 bit words or 1 bit words in the bit map and for refreshing a video monitor using bit aligned, as distinguished from word aligned, video screen and window data.

2. Description of Prior Art

Video systems comprise graphics controllers and video monitors. In a typical graphics controller there are provided a bit map, a circuit for storing video data in the bit map and a circuit for reading the video data from the bit map onto a video monitor. The operations which take place during the storing of the data in the bit map and the reading of the data from the bit map to the video monitor take place in what are commonly called memory update and video monitor refresh modes, respectively.

A typical bit map may be thought of as a large array of memory locations comprising a plurality of multi-bit words. For example, a 4K×4K bit map of 16-bit words comprises a total of over one million words with 256 words in each row of the bit map. The location of each word in the bit map is identified by an X and a Y logical or array address.

In practice, the bit map actually comprises a plurality of memory chips. For example, a typical memory chip may comprise 1K×1K storage locations. Therefore, if 1K×1K memory chips are used, 16 such memory chips are required to store one million 16-bit words. The location of each bit in the memory chip is identified by a row and a column physical address conveniently called RAD and CAD, respectively.

From the above discussion it is evident that in order to address a bit in a memory chip using the logical address of the word in the bit map, it is necessary to generate a row and a column address of the bit in the memory chip from the logical address of the word in the bit map. This is done by translating the X and Y array or logical address of the word in the bit map into a corresponding row and column physical address in the memory chip.

Heretofore, the apparatus required for translating logical addresses of a word in a bit map to corresponding physical addresses of the bit in a memory chip comprised a graphics controller and a random access memory (RAM) controller. In practice, the RAM controller typically comprised a table look-up memory and an address sequencer.

In operation, the graphics controller was provided with the X and Y logical addresses of data words in a bit map and the width of the rows as measured in words in the X direction in the memory chips. From this information, the graphics controller generated corresponding linear addresses as follows:

$$\text{Linear Address} = Y \times \text{width} + X$$

The linear addresses thus generated were then sent to the RAM controller where they were used to generate corresponding row and column physical addresses as well as chip select signals.

The prior art method of generating row and column physical addresses and chip select signals was costly not only in terms of the time it took to perform the computations, i.e. the product and sums, necessary to generate the linear addresses, but it was also costly in that it required a separate apparatus, i.e. the RAM controller.

Another disadvantage of the prior art methods and apparatus for addressing a video memory was that no means was provided for addressing individual bits within a word in the bit map. Heretofore, in order to modify one or more individual bits within a word, it was necessary to read the entire word, modify the desired bit(s) and rewrite the word to the memory. As a result, the modification of individual bits within a word, which is often required when modifying lines and curves on a video display, was very time consuming.

Typically, the number of bits in a bit map in a video system far exceeds the number of pixels on the monitor screen in the system. As a consequence, when video data is presented on the screen, it is taken from only a portion of the bit map. For example, when writing to the screen there are provided a starting address $X_S, Y_S$ and an ending address $X_E, Y_E$ which correspond to and identify a block of words in the bit map to be displayed on the screen. The data thus identified is then scanned and written to the screen.

At times, a portion or a section, i.e. window, of a screen of video data is replaced with other data. The replaced window is called an apparent window and is identified by the starting and ending addresses $X_{AS}, Y_{AS}$ and $X_{AE}, Y_{AE}$ of words in the bit map, respectively. The replacing window is called a real window and is identified by the starting and ending addresses $X_{RS}, Y_{RS}$ and $X_{RE}, Y_{RE}$ of words in the bit map, respectively.

In operation, the data in the bit map to be displayed on the screen is scanned in a regular fashion one line at a time as the physical addresses are generated from the logical addresses. When the address generating apparatus encounters the starting address of an apparent window, it substitutes for the apparent window the data identified by the real addresses $X_{RS}, Y_{RS}$, $X_{RE}$ and $Y_{RE}$.

Heretofore, the methods and apparatus used for displaying bit map data on a screen and for substituting real window data for apparent window data generally has been restricted to word aligned screens and windows. As a consequence, the first and last bit in each uninterrupted portion of a line of data displayed on a screen or in a window has had to correspond to the first and last bit of a word in the bit map. Such a limitation is a significant restriction on the resolution of a video system.

SUMMARY OF THE INVENTION

In view of the foregoing, principal objects of the present invention are a novel method and apparatus comprising means located on a single chip for translating an address of a word in a bit map directly to a corresponding physical address of the word in a memory array without the generation of an intermediate linear or other address.

Other objects of the present invention are a novel method and apparatus as described above comprising means responsive to a mask and a control signal for modifying any group of bits identified in a word.

Other objects of the present invention are a novel method and apparatus comprising a video memory and means for displaying video data on a monitor screen wherein the first and last bit of the displayed data on the screen may correspond to any bit in a word in the video memory.

In accordance with the above objects, there is provided a decoder, a chip size register, a bit map size register, an array address input bus, a physical address output bus, and a data/mask bus.

The array address input bus is provided for sending an X and Y array address of a word in a bit map from a graphics microprocessor to the decoder. The physical address output bus is provided for sending a row and column physical address of the word from the decoder to memory chips. The chip size register and the bit map size register are provided for controlling the translation of the array address to a corresponding physical address in the decoder. The data/mask bus is provided for sending data and mask information to the memory chips.

For purposes of describing the translation of array addresses to physical addresses according to the present invention, there is provided a rectangular bit map comprising 4K×4K rows and columns of bits comprising 16-bit words with 256 words in each row. Corresponding to the bit map there are provided 16 1K×1K memory chips. The memory chips are organized in such a manner that each of the memory chips stores one bit from each of the 16-bit words in the bit map. For example, bit 0 of all of the words in the bit map is stored on chip 0, bit 1 of all of the words is stored on chip 1, bit 2 of all of the words is stored on chip 2, etc. As a consequence, whenever a word is addressed, all 16 memory chips are automatically selected simultaneously thus eliminating the need to generate a specific chip select signal.

Each array address comprises 24 bits, e.g. $X_0$–$X_{11}$ and $Y_0$–$Y_{11}$. Four bits of one of the 24-bit X and Y array address, e.g. $X_0$–$X_3$, are available to be used for generating a mask. The remaining 20 bits, e.g. $X_4$–$X_{11}$ and $Y_0$–$Y_{11}$ are sufficient to address the 1K×1K memory chips.

The use of the array address bits $X_4$–$X_{11}$ and $Y_0$–$Y_{11}$ in the decoder to generate the row and column physical addresses RAD and CAD depends on the bit map size and the chip size. For example, with a 4K×4K bit map and 16 1K×1K memory chips, array address bits $Y_0$–$Y_9$ are used directly as the physical row address RAD and array address bits $X_4$–$X_{11}$, $Y_{10}$ and $Y_{11}$ are used directly as the physical column address CAD. With a 4K×4K bit map and 16 512×512 memory chips in each of four banks, array address bits $Y_0$–$Y_8$ are used directly as the physical row address RAD, array address bits $X_4$–$X_{11}$ and $Y_9$ are used directly as the physical column address CAD and array address bits $Y_{10}$ and $Y_{11}$ are used directly to select one of the four banks. With a 4K×4K bit map and 16 256×256 memory chips in each of 16 banks, array address bits $Y_0$–$Y_7$ are used directly as the physical row address RAD, array address bits $X_4$–$X_{11}$ are used directly as the physical column address CAD and array address bits $Y_8$–$Y_{11}$ are used directly to select one of the 16 banks.

When updating the bit map, it is often desirable to change one or more pixels in a word without disturbing the remaining pixels in the word. Accordingly, there is further provided in accordance with the above objects means responsive to a control signal designated $\overline{WE}$ and the above described mask for modifying any selected group of bits inside a word. For example, in one embodiment, the bits $X_{0-X3}$ are used to generate the mask and identify one of the 16 bits of a word addressed by the remaining address bits $X_4$–$X_{11}$ and $Y_0$–$Y_{11}$. In this manner, the identified bit can be changed in the addressed word.

Further in accordance with the above objects, there are provided a video data assembly first-in, first-out memory circuit (VDAF) and associated control signal generators. The VDAF is provided for allowing the display of bit aligned, as distinguished from word aligned, data on a video monitor. For example, when a full screen of data is to be written to the monitor, the starting and ending addresses of the corresponding data in the bit map are examined. If the examined addresses indicate that the data to be displayed is not word aligned, e.g. the left edge of the displayed data corresponds to the third bit in each of the data words involved, the data words are transferred out of the bit map but only the bits to be displayed are transmitted out of the VDAF to the screen. The method and apparatus used for displaying a screen of bit aligned data are also used for displaying bit aligned windows of data, i.e. blocks of data which comprise less than a full screen.

BRIEF DESCRIPTION OF THE DRAWING

The above and other objects, features and advantages of the present invention will become apparent from the following description of the accompanying drawing in which:

FIG. 3 is a block diagram of a plurality of memory arrays according to the present invention;

FIG. 5 is a diagram of a RAD and CAD address according to the present invention wherein $Y_{10}$ and $Y_{11}$ are used as the two most significant bits of the CAD for addressing 1K×1K memory arrays;

FIG. 6 is a diagram of an exemplary X and Y address prior to translation according to the present invention;

FIGS. 7-9 are diagrams of the translation of three logical addresses into three physical addresses according to the present, invention;

DETAILED DESCRIPTION OF THE INVENTION

Figure 1A:
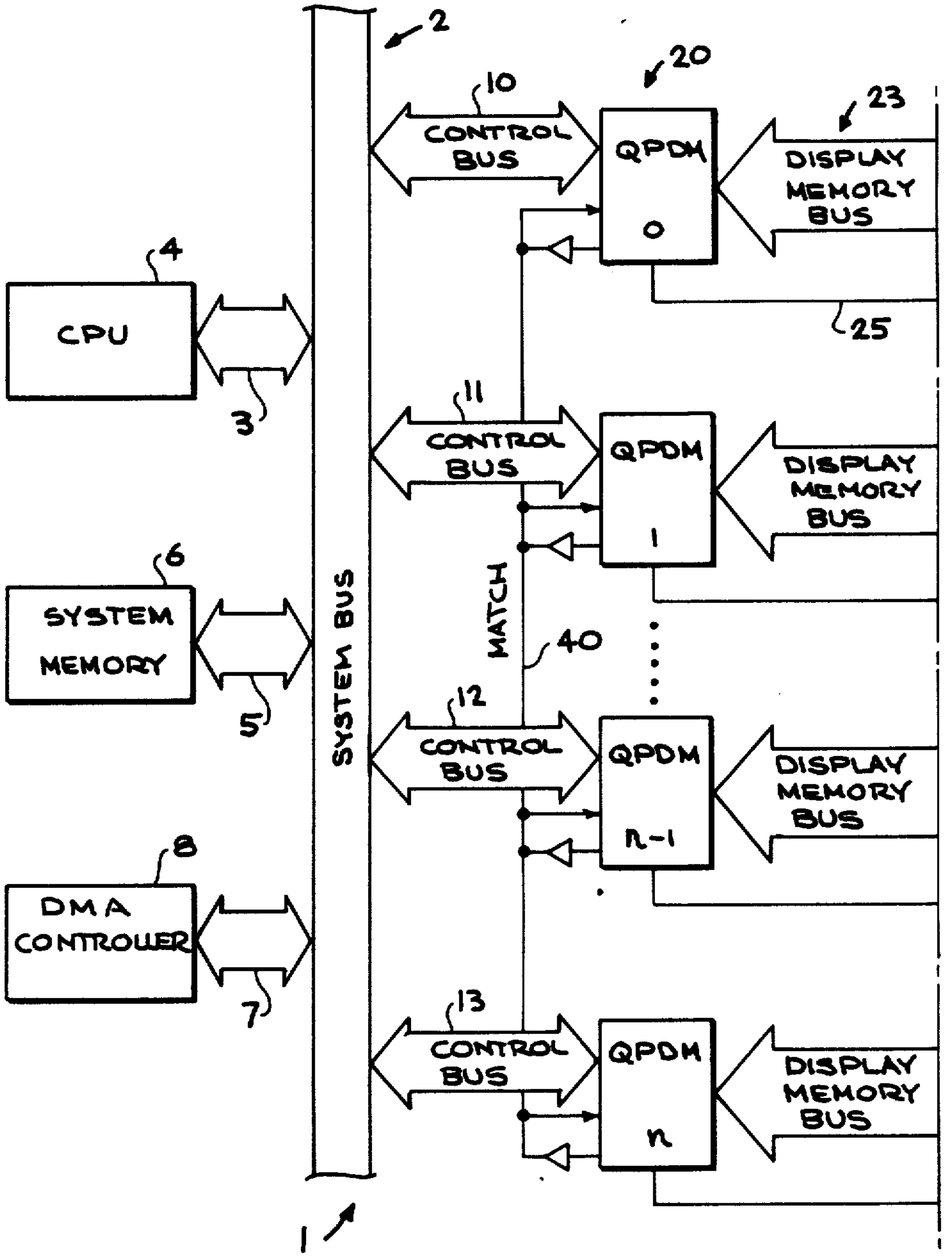
FIG. 1 is a block diagram of a video system according to the present invention.
Figure 1B:
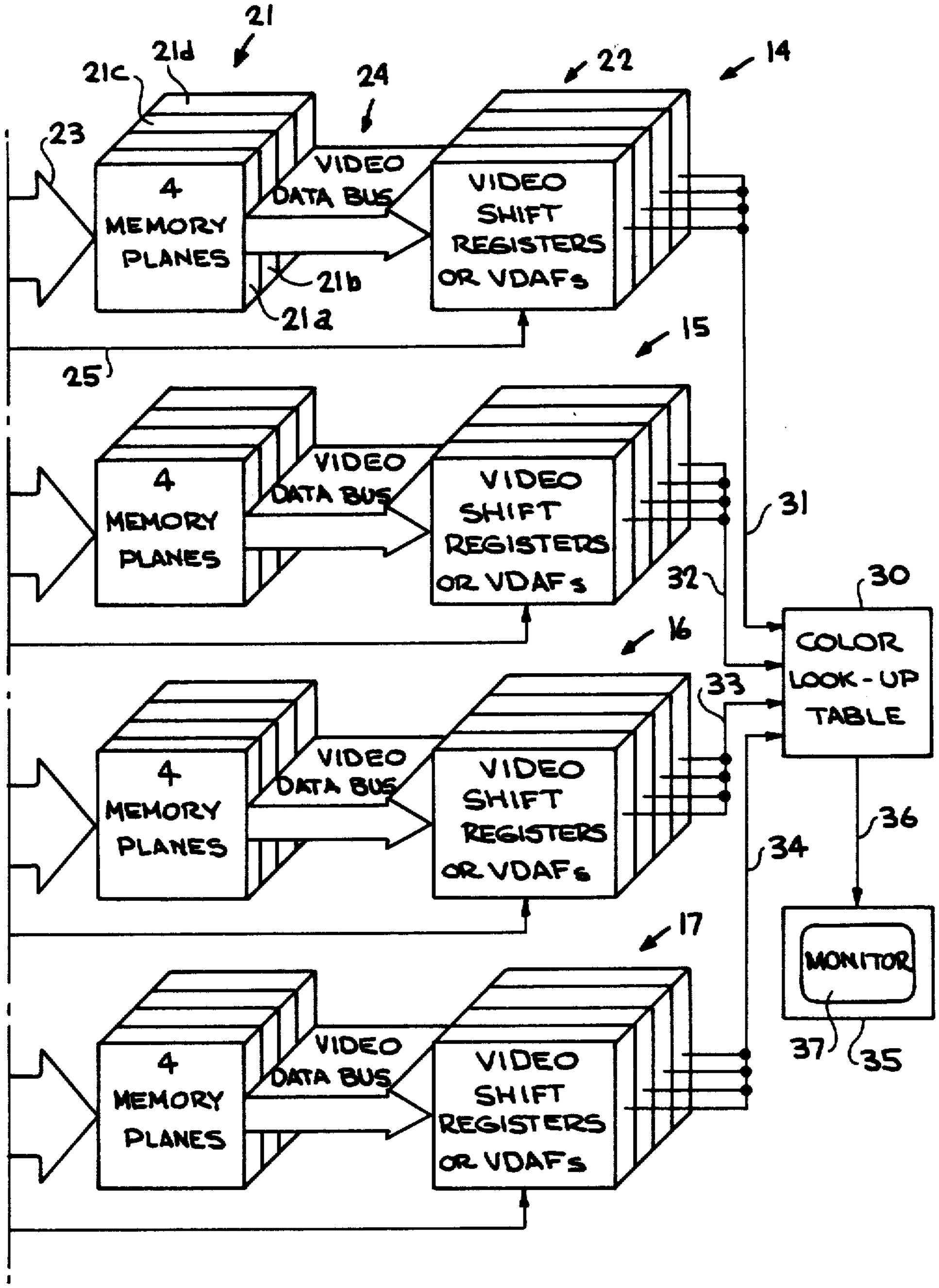

Referring to FIG. 1, there is provided in accordance with the present invention a video display system designated generally as 1. In the display system 1 there is provided a system bus designated generally as 2. Coupled to the bus 2 by means of a bus 3 there is provided a central processing unit (CPU) 4. Coupled to the bus 2 by means of a bus 5 there is provided a system memory 6. Coupled to the bus 2 by means of a bus 7 there is provided a DMA controller 8. Also coupled to the bus 2 by means of a plurality of control buses 10, 11, 12 and 13, there is provided a plurality of graphics controllers designated generally as 14, 15, 16 and 17. Controllers 14–17 are also designated 0–n to show that any number of controllers may be cascaded on the bus 2.

Each of the controllers 14–17 comprise a quad pixel data manager (QPDM) designated generally as 20, a video random access memory (VRAM) designated generally as 21 comprising a plurality of 4 memory planes 21*a*, 21*b*, 21*c* and 21*d*, and a plurality of video shift registers or 4 video data assembly first-in, first-out memory circuits (VDAF's) designated generally as 22. The VRAM 21 is coupled to the QPDM 20 by means of a 64 bit line display memory bus 23. The video shift registers or VDAF's 22 are coupled to the VRAM 21 by means of a video data bus 24. Control signals are provided to the video shift registers or VDAF's 22 by the QPDM 20 by means of a control bus 25. The outputs of the video shift registers or VDAF's 22 of the controllers 14–17 are coupled to a color look-up table 30 by means of a plurality of signal lines 31, 32, 33 and 34, respectively. The output of the color look-up table 30 is coupled to a video monitor 35 comprising a screen 37 by means of a video data bus 36. Coupling each of the QPDM's 20 in the controllers 14–17 there is provided a sync signal bus 40. The sync signal bus 40 is provided for synchronizing all of the QPDM's 20 in the controllers 14–17.

Figure 2:
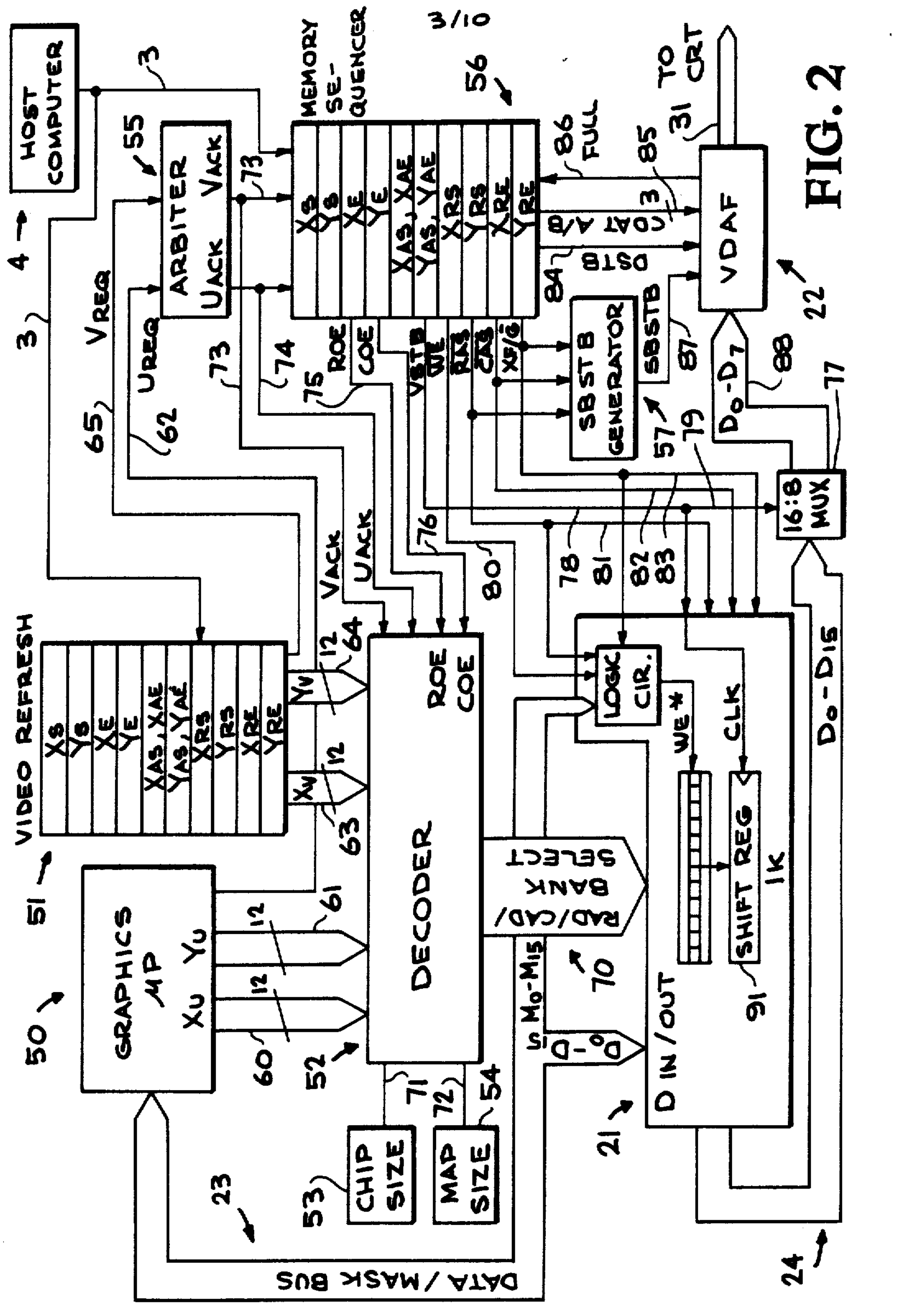
FIG. 2 is a detailed block diagram of an embodiment of the present invention.

Referring to FIG. 2, there is provided in each of the graphics controllers 14–17 a graphics microprocessor 50, a video refresh circuit 51, a decoder 52, a chip size register 53, a bit map size register 54, an arbiter circuit 55, a memory sequencer circuit 56, and a start bit strobe (SBSTB) generator 57.

The graphics microprocessor 50 is coupled to the VRAM 21 by means of the display memory bus 23, which for purposes of the present invention is also called a data/mask bus, to the decoder 52 by means of a pair of 12 bit line X and Y logical address buses 60 and 61 and to the arbiter circuit 55 by means of an update request ($U_{REQ}$) control signal line 62.

The video refresh circuit 51 is coupled to the decoder 52 by means of a pair of 12 bit line X and Y logical address buses 63 and 64 and to the arbiter 55 by means of a video request ($V_{REQ}$) control signal line 65.

The decoder 52 is coupled to the VRAM 21 by means of a 12 bit line RAD/CAD/BANK SELECT physical address bus 70. The chip size register 53 is coupled to the decoder 52 by means of a bus 71. The bit map size register 54 is coupled to the decoder 52 by means of a signal line 72. The arbiter 55 is coupled to the memory sequencer 56 and to the decoder 52 by means of a video acknowledge ($V_{ACK}$) control signal line 73 and an update acknowledge ($U_{ACK}$) control signal line 74.

The memory sequencer 56 is coupled to the decoder circuit 52 by means of a row output enable (ROE) control signal line 75 and a column output enable (COE) control signal line 76, to the VRAM 21 and a 16-to-8 multiplexer 77 by means of a pair of video strobe (VSTB) control signal lines 78,79, to the VRAM 21 by means of a write enable ($\overline{WE}$) control signal line 80, a row address strobe ($\overline{RAS}$) control signal line 81, a column address strobe ($\overline{CAS}$) control signal line 82 and a transfer/gate enable ($\overline{XF/G}$) control signal line 83. The lines 81, 82 and 83 are also coupled to corresponding inputs of the SBSTB generator 57.

The memory sequencer 56 is also coupled to the VDAF's 22 by means of a data strobe (DSTB) control signal line 84, a 3 bit line control data $A/\overline{B}$ (CDAT $A/\overline{B}$) control signal bus 85 and to a full ($\overline{FULL}$) control signal line 86.

The SBSTB generator 57 is coupled to the VDAF's 22 by means of a start bit strobe (SBSTB) control signal line 87. The multiplexer 77 is coupled to the VDAF's 22 by means of an 8 bit line data bus 88 and to the VRAM 21 by means of a 16 bit line data bus 24.

Figure 4:
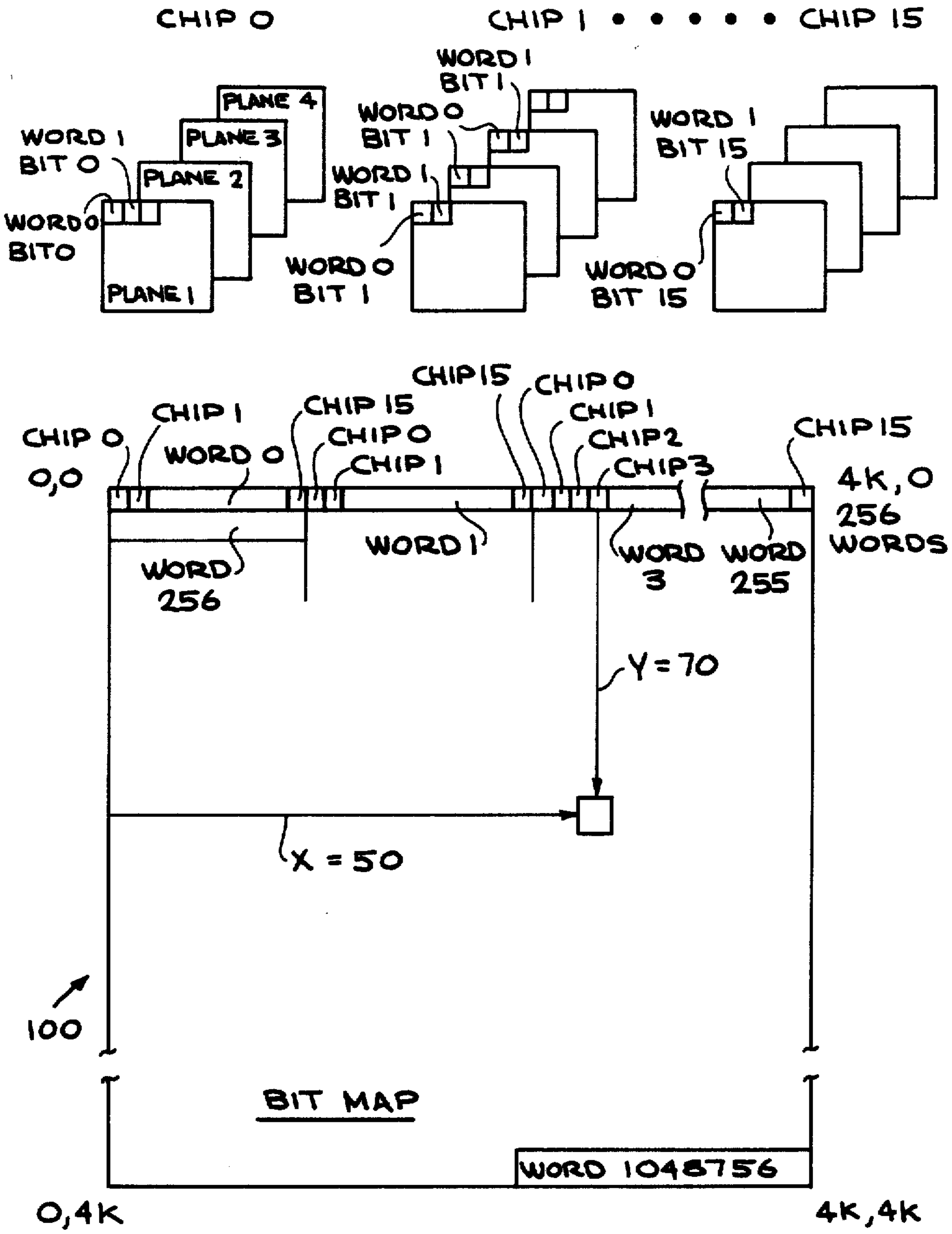
FIG. 4 is a diagram of a bit map and a plurality of memory arrays according to the present invention.

Referring to FIGS. 2–4, in one embodiment of the present invention, the VRAM 21 comprises 16 identical memory chips designated chip 0–chip 15. Each of the memory chips 0–15 comprises a 1K×1K bit memory array 90, a 1K bit data shift register 91, a logic circuit 92. The memory array 90 is coupled to the shift register 91 by means of a plurality of 1K bit lines. The output of the shift register 91 is coupled to the multiplexer 77 by means of the multiline bus 24. The logic circuit 92 is coupled to the lines 80, 81 and 83 and to one line of the data/mask bus 23.

In addition to the above, each of the chips 0–15 comprises the four identical memory planes designated 21*a*–21*d* described above. Planes 21*a*–21*d* are provided for storing data corresponding to the primary colors red, blue and green and another pixel attribute such as bright or blinking.

Referring to FIG. 4, there is provided a bit map designated generally as 100 which corresponds to the VRAM 21 of FIGS. 1–3. The bit map 100 is 4K bits wide by 4K bits long. With each word stored in the VRAM 21 comprising 16 bits, each row of the bit map 100 comprises 256 words. The total number of the words represented by the bit map comprises 1,048,576.

In accordance with the present invention, a bit from each word in the bit map 100 is stored on a different one of the memory chips 0–15. For example, bit 0 of each word is stored on chip 0, bit 1 of each word is stored on chip 1, bit 2 of each word is stored on chip 2, etc. Thus when addressing a word in the bit map 100 in the execution of a normal read/write operation, all of the memory chips 0–15 are selected simultaneously and automatically. Therefore, it is not necessary to generate a separate address on the address buses 60 and 61 or 63 and 64 to address a word in the bit map 100.

The address buses 60, 61, 63 and 64 each comprises twelve lines for handling twelve address bits $A_0$–$A_{11}$ of a pair of X and Y logical or array addresses.

As is well known, to address one of the chips 0–15 in the VRAM 21 which comprises a plurality of dynamic storage cells, it is necessary to translate the logical address pair X,Y to a pair of physical addresses. The translation typically involves the generation of an intermediate linear address which is obtained by adding the X coordinate of the X,Y pair measured in words to the product of the width of the VRAM 21 and the Y coordinate of the X,Y pair measured in words, as follows:

$$\text{Linear Address} = Y \times \text{width} + X$$

For example, if the logical or array address of a word in the bit map 100 has the coordinates Y=70 and X=50 as shown in FIG. 4, the linear address is obtained by performing the following mathematical computations:

$$\text{Linear Address} = \frac{4096}{16} \times 70 + \frac{50^*}{16} = 17923 \text{ words} \quad (1)$$

where

4096=number of bits in a row or scanline of the bit map 100

16=number of bits in a word in the bit map 100

70=number of entire rows preceding the row in which the desired word is located

50=the bit position in a row of a bit in the desired word

*The fractional remainder in the quotient corresponds to bit number 2 which is the third bit in the desired word. In prior known systems limited to addressing entire words, this fractional remainder would ordinarily be ignored. As will be described below, in accordance with the present invention the fractional remainder may be used for addressing bits within a word when performing a video refresh.

In accordance with the present invention, it was also recognized that so long as a bit map corresponds to a memory array having a width as measured in words equal in number to a power of 2 and words comprise bits equal in number to a power of 2, the time consuming divisions, multiplications and additions in the above-described computations for a linear address could be reduced to simple left and right shift operations in general, and more specifically, they could be performed in a simple combinatorial circuit. For example, equation (1) above can be written as follows:

$$\text{Linear Address} = 256 \times 70 + 3 \text{ (remainder 2)} \quad (2)$$

or $$\text{Linear Address} = 2^8 \times 70 + \frac{50}{2^4} \quad (3)$$

Referring to FIGS. 5 and 6, concatenating the X and Y logical addresses one obtains 24 address bits. Referring to equation (3), it will be seen that the first or Y term of the equation (3) is 70 multiplied by a power of 2, namely 8, and that the second or X term of the equation (3) is 50 divided by a power of 2, namely 4. As previously mentioned, multiplying and dividing by powers of 2 is the equivalent of shifting the numbers multiplied and divided by the power of 2, respectively. Thus, if one shifts the binary equivalent of 70 eight places to the left and the binary equivalent of 50 four places to the right and concatenates them, the linear address will appear as shown in FIG. 5. In the case when the bit map is implemented with 1K×1K memory chips, the 20 bit linear word address can be multiplexed into a 10 bit RAD and a 10 bit CAD, as shown in FIG. 5, to strobe the address information into the memory chips.

It will be noted from the above operations that by shifting the X term to the right four places, the address bits $X_0$–$X_3$ are not used in addressing a word in the bit map 100. However, it will be noted that the address bits $X_0$–$X_3$ represent specific bits within the word desired. These bits may be retained in an appropriate circuit and used when addressing a specific bit within a desired word. It will also be noted that since each of the chips 0–15 comprise 1K×1K memory cells, 20 X and Y address bits are all that are required to address any location within the memory chip. As a consequence, the X and Y address bits $X_4$–$X_{11}$ and $Y_0$–$Y_{11}$ may be rearranged and used directly for generating the row physical address (RAD) and the column physical address (CAD) as shown in FIG. 7.

Referring to FIGS. 8 and 9, it will be noted that the address $Y_{10}$ and $Y_{11}$ are used as a BANK SELECT bits in those embodiments in which the bit map 100 corresponds to a VRAM comprising 512×512 bit cells and that $Y_8$–$Y_{11}$ are used as BANK SELECT bits in those embodiments in which the bit map 100 corresponds to a VRAM comprising 256×256 bit memory arrays, respectively. The mapping of the address bits in the translation of the logical addresses to the row and column physical addresses RAD and CAD by the decoder 52 as seen in FIGS. 7–9 are controlled by the chip size and the bit map size numbers placed in the registers 53 and 54, respectively.

In operation, the updating of the VRAM 21 is initiated by the graphics microprocessor sending an update request ($U_{REQ}$) to the arbiter 55. In response to the update request, if no video request which takes priority is present, the decoder 52 translates the X and Y logical addresses on the buses 60 and 61 into row and column physical addresses RAD and CAD for addressing the VRAM 21 by simply routing the X and Y address bits to their relative positions $A_0$–$A_{11}$ on the bus 70, as shown in FIGS. 7–9 depending on the size of the memory chips and bit map used.

Figure 10:
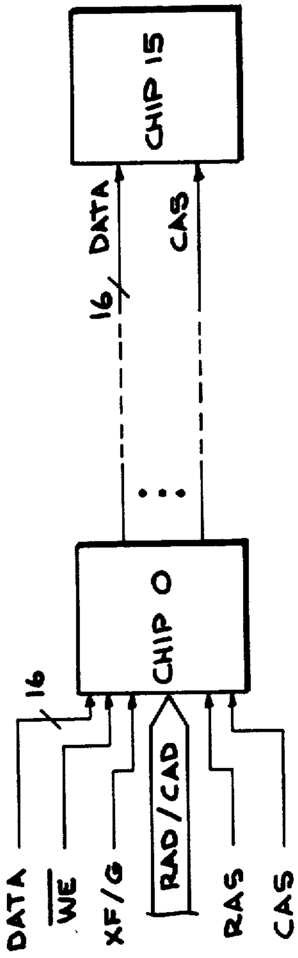
FIG. 10 is a block diagram showing a data bus and array of memory chips according to the present invention.
Figure 11:
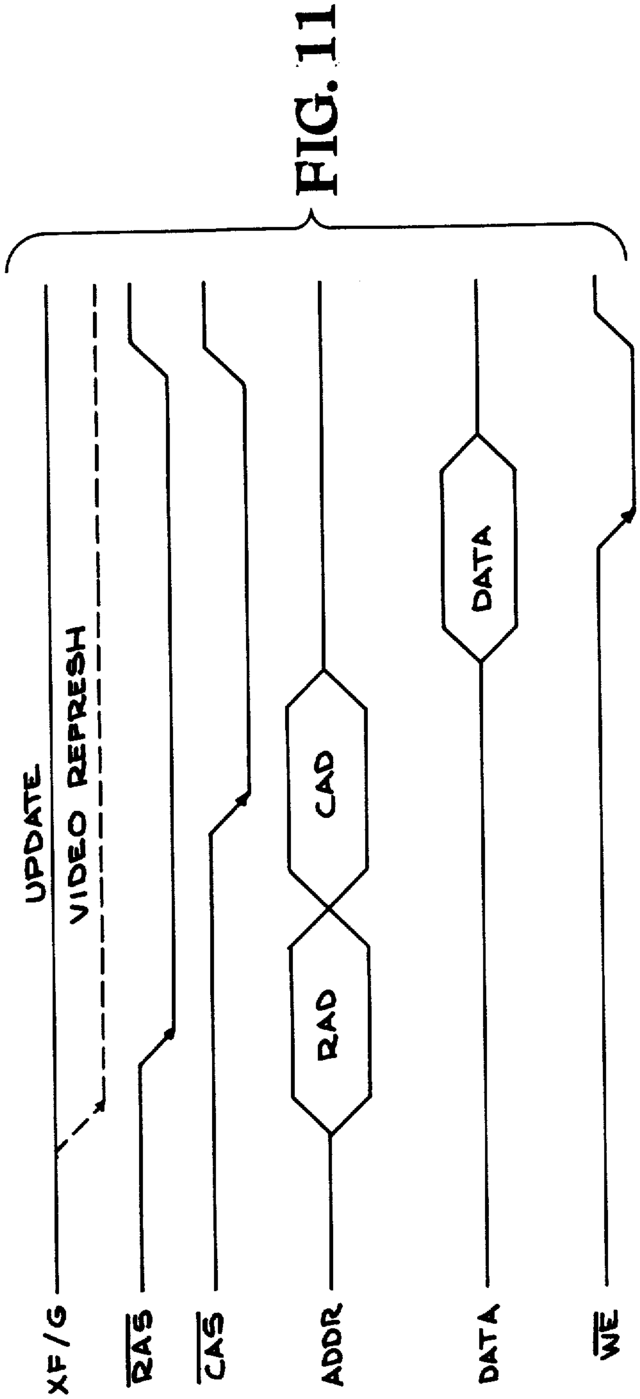
FIG. 11 is a plurality of timing diagrams showing the relationship of timing signals for normal read/write update and video refresh operations.
Figure 12:
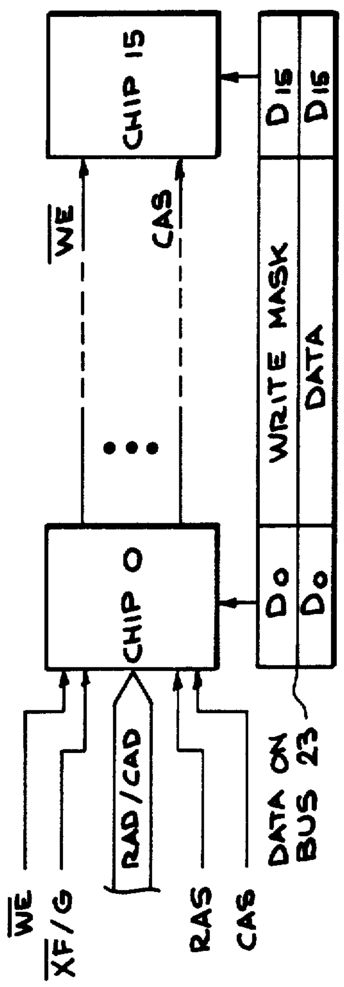
FIG. 12 is a block diagram of a data/mask register and a plurality of memory arrays according to the present invention.
Figure 13:
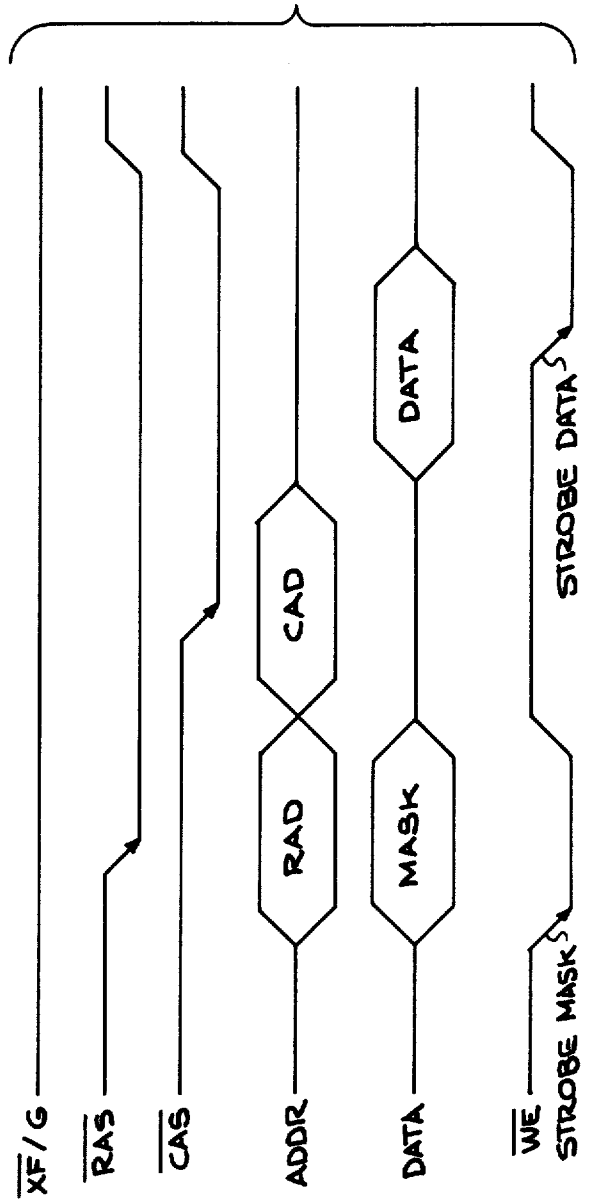
FIG. 13 is a plurality of timing diagrams showing the relationship of timing signals during a masked write operation.

Referring to FIGS. 10 and 11, data on the bus 23 is written into the chips 0-15 at the address identified by the RAD and CAD physical addresses when the transfer signal $\overline{XF/G}$ is high and the write enable signal $\overline{WE}$ goes active. The signals $\overline{RAS}$ and CAS strobe RAD and CAD into the chips. If $\overline{XF/G}$ is low when $\overline{RAS}$ goes active, a whole row specified by RAD is transferred into the shift register 91. The column position from where the data starts being shifted out is specified by CAD.

To make modifications to lines and curves displayed on the video monitor 35, predetermined bits within a word in the bit map 100 are modified. This is accomplished by selectively enabling corresponding ones of the memory chips 0–15 by placing a mask on the data/mask bus 23 and transmitting it to the logic circuit 92.

Referring to FIGS. 2, 3, 12 and 13, in operation when a selected bit in a word is to be written, a 16-bit mask is placed on the data/mask bus 23 and transferred to the memory chips 0–15, i.e. one mask bit to each chip. The bits in the mask corresponding to the bits to be written in the word in the chips 0–15 comprise logical 1's.

When the mask is used, two write enable strobes $\overline{WE}$ are generated during a write cycle. The first is called a mask strobe; the second is called a data strobe. If RAS goes LOW when the mask strobe is LOW, the logic circuit 92 in each of the memory chips 0–15 stores the corresponding bit 0–15 in the mask. The mask is used for gating the data strobes. In the case where the bit in the stored mask is a logical 1, the data strobe $\overline{WE}$ will be allowed to propagate through the logic block 92 and will emerge as a gated data write enable signal $\overline{WE}$* on the line 95. Thus, the data strobe signal $\overline{WE}$ will strobe data on the data bus 23 only into the chip or chips enabled by the mask strobe. For example, if only bit 5 of a word is to be written, only chip 5 will be enabled by the mask when $\overline{WE}$* is generated. Alternatively, if only bits 2 and 14 of a word are to be written, only chips 2 and 14 will be enabled by the mask when $\overline{WE}$ * is generated.

Figure 14:
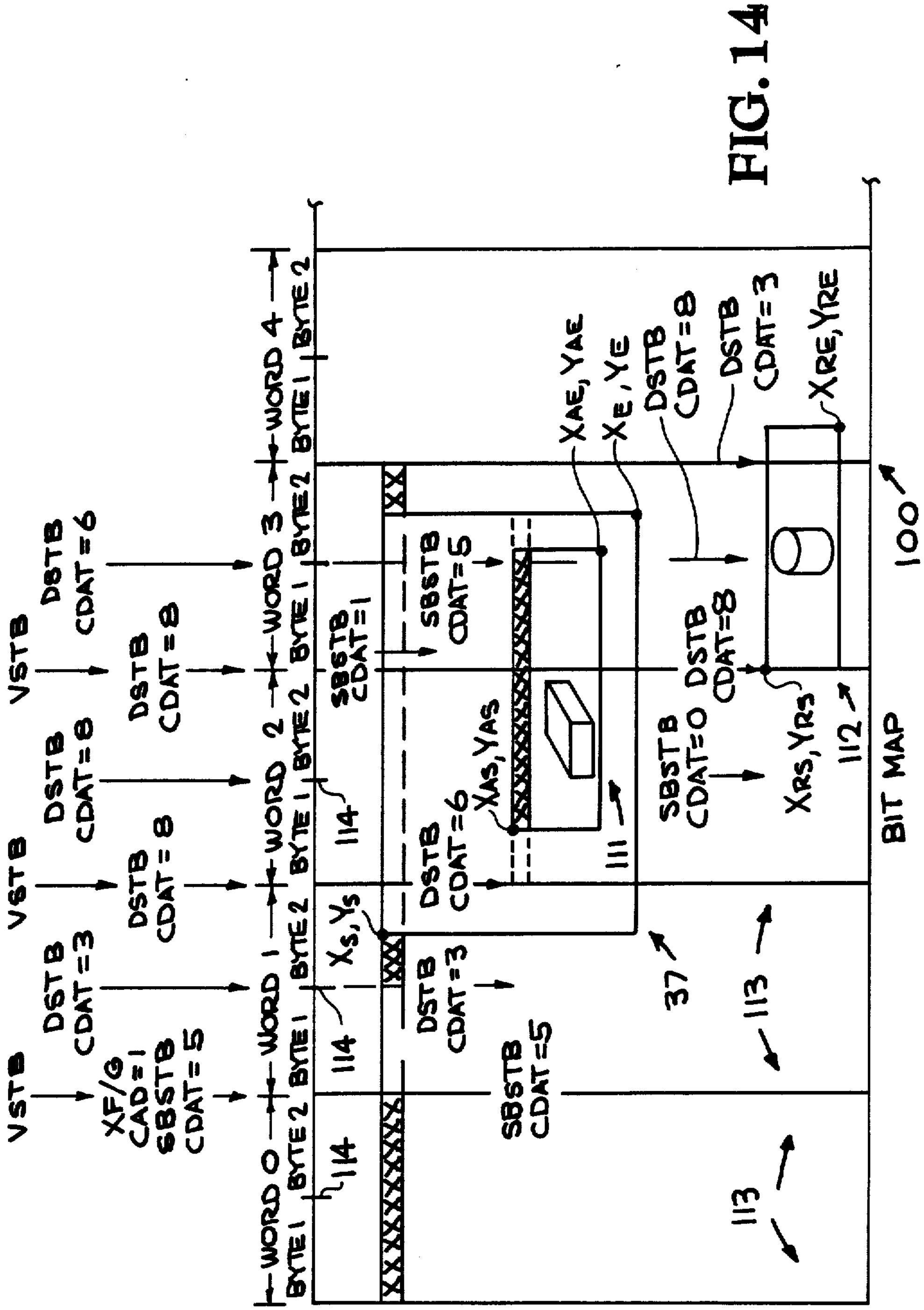
FIG. 14 is a detailed diagram of a bit map showing the control signals used for transferring data from a plurality of memory arrays for display on a video monitor according to the present invention.

Referring to FIG. 14, there is provided a representation of the bit map 100 on which is superimposed a representation of the screen 37 of the video monitor 35. The boundaries of the screen 37 are defined by a logical starting address $X_S,Y_S$ and a logical ending address $X_E,Y_E$. Within the boundaries of the screen 37 there is represented an apparent window 111. The boundaries of the apparent window 111 are defined by an apparent window logical starting address $X_{AS},Y_{AS}$ and a logical ending address $X_{AE},Y_{AE}$ Outside the boundaries of the screen there is provided a representation of a real window 112. The boundaries of the real window 112 are defined by a logical starting address $X_{RS},Y_{RS}$ and a logical ending address $X_{RE},Y_{RE}$.

Each row or scan line of the bit map 100 comprises a plurality of 4096 bits, e.g. 256 16-bit words. The boundaries of the words are represented by a plurality of vertical lines 113. The boundaries of each 8-bit byte in a word are represented by the lines 113 and a plurality of intermediate vertical lines 114.

As shown in FIG. 14, the starting and ending addresses of the screen 37, the apparent window 111 and the real window 112 may correspond to bit positions located inside the boundaries of the bit map 110 as well as inside the word and byte boundaries 113 and 114, respectively.

In operation, a video refresh cycle is initiated by the generation of a video request ($V_{REQ}$) on the line 65 as shown in FIG. 2. Prior to the video refresh operation, the above identified addresses $X_S,Y_S$, $X_E,Y_E$, $X_{AS},Y_{AS}$, $X_{AE},Y_{AE}$, $X_{RS},Y_{RS}$, $X_{RE}$ and $Y_{RE}$ are transferred by the CPU 4 to the video refresh circuit 51 and the memory sequencer 56. In response to these addresses, transfer cycle signals $\overline{XF/G}$, video strobes VSTB and data strobes DSTB are generated by the sequencer 56 and RAD's and CAD's are provided on the bus 70 by the decoder 52 for each of the logical addresses placed on the buses 63,64 by the circuit 51.

In response to the transfer cycle signal $\overline{XF/G}$, and a RAD, an entire row of data addressed by the RAD in each of the memory chips 0–15 is transferred in parallel to the shift register 91 associated with that memory chip. Thereafter, in response to each VSTB, a bit is shifted out of each of registers 91 such that a 16-bit word is made available to the VDAF's 22 with each VSTB.

At this point it should be noted that the shift registers 91 are of the addressable type such that the first bit to be shifted out of each register is a bit in a word comprising bits which are to be displayed on the screen 37 as indicated by the address $X_S$. For example, if, as shown in FIG. 4, word 3 is the first word in the row of data transferred to the shift registers 91 comprising bits to be displayed, then CAD=3 and word 3 is the first word to be shifted out of the registers 91. After word 3 is shifted out of the registers 91, words 4, 5, 6, etc., are shifted out in sequence. By use of the CAD addressable shift registers 91, no time is lost shifting words which comprise no bits that will be displayed.

Even though word 3 is shifted out of the shift registers 91, not all of the bits of the word will necessarily be latched into the VDAF's 22. Words shifted out of the registers 91 are transferred to the VDAF's 22 in 8-bit bytes. Through the 16-to-8 multiplexers 77, however, only those bytes containing bits to be displayed are latched into the VDAF's 22 by the DATA bit strobe DSTB.

The start bit strobe SBSTB, is generated after the transfer cycle, before the first byte is strobed into the VDAF 22. The SBSTB signal is generated together with a signal CDAT A which is placed on the 3-bit lines 85. CDAT A identifies the first bit to be displayed and consequently the first bit to be shifted out of the VDAF's 22 to the color look-up table 30. In the example shown in FIG. 14, CDAT A=5 as determined by the starting address $X_S$.

Following the generation of the strobe SBSTB and CDAT A, a data strobe DSTB and a CDAT B are generated at the beginning of each byte. CDAT B identifies the number of bits in a byte to be displayed. In the present example, in the row defined as $Y_S$, the first DSTB signal is accompanied by CDAT B=3, indicating that the first byte has three bits to be displayed. Then, three complete bytes are described by CDAT B=8. At the right end of the row $Y_S$ defined by $X_E$, CDAT B=6 is generated. This means that only six bits in byte 2 of word 3 are to be displayed.

At the end of row $Y_S$ defined by $X_E$, $Y_S$ is incremented to $Y_s+1$, another transfer cycle is XF/G is generated and the above described operations are repeated. These operations are repeated for each row displayed on the screen until a row with a window is encountered.

Figure 15:
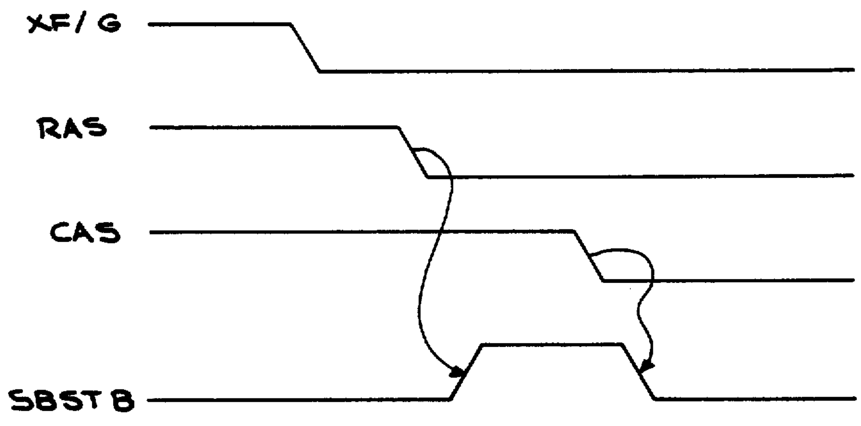
FIG. 15 is a plurality of timing diagrams showing the generation of a start bit strobe control signal according to the present invention.
Figure 16:
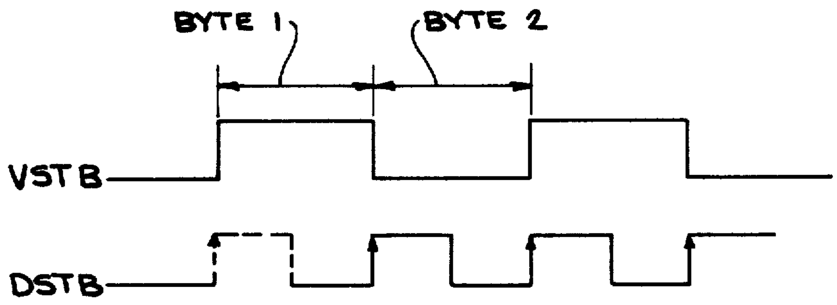
FIG. 16 is a timing diagram showing the relationship between a video strobe and a data strobe according to the present invention.

Referring to FIGS. 15 and 16, a strobe SBSTB is generated after each transfer cycle and data strobes DSTB are generated for each byte. In rows having no window segment, only one transfer cycle is generated for each row. In rows having a window segment, three transfer cycles $\overline{XF/G}$ are generated for each row; one at the beginning of the screen, one at the beginning of the window segment and another at the end of the window segment. For example, in a row containing a window segment such as the row defined by $Y_{AS}$ in FIG. 14, the first SBSTB with a CDAT A=5 is generated. This is followed by a DSTB with a CDAT B=3. Another DSTB with a CDAT B=6 follows. CDAT B=3 indicates that 3 bits of byte 2 of word 1 are to be displayed. CDAT B=6 indicates that 6 bits of byte 1 of word 2 are to be displayed. Next, the second transfer cycle with SBSTB with a CDAT A=0 is generated to define the start of the real window. The CDAT A=0 indicates that the starting bit is the first bit of the byte. This SBSTB is followed by two DSTB's with a CDAT B=8 and one DSTB with a CDAT B=3. After the last DSTB, the third transfer cycle with SBSTB is generated with a CDAT A=1. The latter CDAT A=1 indicates that the remaining background to be displayed on the screen begins with bit 1 of byte 2 of word 3. This is followed by DSTB with CDAT B=5. As seen in FIG. 16, CDAT A and CDAT B are associated with the first byte of a word if VSTB is HIGH and with the second byte of a word if VSTB is LOW. If the first byte of the word after a transfer cycle is to be strobed into the VDAF, SBSTB and DSTB pulses are generated. If the first byte is to be disregarded, the first DSTB pulse is omitted.

While a preferred embodiment of the present invention is described above, it is understood that various modifications may be made thereto without departing from the spirit and scope thereof. Accordingly, it is intended that the scope of the invention not be limited to the embodiments described but be determined by reference to the claims hereinafter provided.

What is claimed is:

1. A video system comprising:

a plurality of identical memory arrays having a plurality of physical row address inputs and a plurality of physical column address inputs for storing a plurality of words, each of said words having a predetermined number of bits, each of said arrays having an addressable output buffer;

means for storing a different predetermined one of said bits from each of said plurality of words in each one of said arrays such that each array contains the same bit from each one of said plurality of words;

means for providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

first means for storing a number corresponding to said number of bits in each of said memory arrays;

second means for storing a number corresponding to the total number of bits in said bit map;

first means coupled to said logical row and column address providing means which is responsive to the numbers stored in said first and second storing means for shifting said binary equivalent of said logical row address a predetermined number of places to the left for providing a physical row address comprising a predetermined number of shifted logical row address bits;

second means coupled to said logical row and column address providing means which is responsive to the numbers stored in said first and second storing means for shifting the binary equivalent of said logical column address a predetermined number of places to the right for providing a physical column address comprising a predetermined number of shifted logical column address bits;

means coupled to said first and second shifting means for selectively applying said physical row and physical column addresses to said physical row address inputs and said physical column address inputs of said plurality of memory arrays, respectively;

means responsive to said physical row address applied to each of said arrays for transferring the bits in an entire row addressed thereby to said addressable output buffer in said array; and means responsive to said physical column address for shifting bits sequentially out of each of said addressable output buffers in each of said arrays commencing with the bit addressed by said physical column address such simultaneously at the output of said addressable output that all the bits of each word are made available buffer.

2. A system according to claim 1 wherein each of said physical row and column addresses address a bit at a physical address in each of said memory arrays and further comprising:

a data/mask bus having a plurality of bit lines, a different one of said bit lines being coupled to each of said plurality of memory arrays;

means for providing data on said bit lines;

means for selectively providing a row address strobe signal ($\overline{RAS}$), a column address strobe signal ($\overline{CAS}$), a write enable control signal ($\overline{WE}$) and a transfer cycle control signal (XF/G), said XF/G and said $\overline{WE}$ having a first (LOW) and a second (HIGH) state; and means responsive to said $\overline{RAS}$, said $\overline{CAS}$, said $\overline{WE}$, said XF/G and said physical address for storing said data on said bit lines in said plurality of memory arrays at said physical address when said XF/G is in its second (HIGH) state and said $\overline{WE}$ is in its first (LOW) state.

3. A video system according to claim 1 wherein said plurality of memory arrays comprise a plurality of memory banks having a plurality of bank select address inputs and further comprising:

means for selectively applying a predetermined number of said shifted logical row address bits to said bank select address inputs of said memory banks for addressing said memory banks.

4. A video system according to claim 1 wherein said first shifting means comprises means for shifting said binary equivalent of said logical row address A places to the left where $2^A$ equals B and B equals the number of words in a row of the bit map for providing said predetermined number of shifted logical row address bits and said second shifting means comprises means for shifting said binary equivalent of said logical column address C places to the right where $2^C$ equals D and D equals the number of bits in each of said words for providing said predetermined number of shifted logical column address bits.

5. A video system according to claim 1 comprising:

a video data register means;

multiplexing means coupled between said buffer and said video data register means for transferring bytes of each of said words from said buffer to said video data register means;

means coupled to said video data register means for latching predetermined bits from said bytes into said video data register means; and means for transferring said predetermined bits from said video data register means to said video display.

6. In a video system comprising:

a plurality of identical memory arrays having a plurality of physical row address inputs and a plurality of physical column address inputs for storing a plurality of words, each of said memory arrays having a predetermined number of rows and columns of storage locations for storing a predetermined bit from each of said words and an addressable output buffer for receiving a row of said bits in response to a physical row address, a method of transferring data in said system comprising the steps of:

providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

storing a number corresponding to said number of bits in each of said memory arrays;

storing a number corresponding to the total number of bits in said bit map;

shifting in response to the numbers stored in said first and second storing means said binary equivalent of said logical row address a predetermined number of places to the left for providing said physical row address comprising a predetermined number of shifted logical row address bits;

shifting in response to the numbers stored in said first and second storing means the binary equivalent of said logical column address a predetermined number of places to the right for providing a physical column address comprising a predetermined number of shifted logical column address bits;

selectively applying said physical row and physical column addresses to said physical row address inputs and said physical column address inputs of said plurality of memory arrays;

transferring in response to said physical row address in each of said arrays the bits in an entire row addressed thereby to said addressable output buffer in said array: and shifting bits sequentially out of each of said addressable output buffers in each of said arrays in response to said physical column address commencing with the bit addressed by said physical column address such that all the bits of each word are made available simultaneously at the output of said addressable output buffer.

7. A method according to claim 6 wherein each of said physical row and column addresses address a bit at a physical address in each of said memory arrays and further comprising the steps of:

providing a data/mask bus having a plurality of bit lines, a different one of said bit lines being coupled to each of said plurality of memory arrays;

providing data on said bit lines;

selectively providing a row address strobe signal ($\overline{RAS}$), a column address strobe signal ($\overline{CAS}$), a write enable control signal ($\overline{WE}$) and a transfer cycle control signal ($\overline{XF/G}$), said $\overline{XF/G}$ and said $\overline{WE}$ having a first (LOW) and a second (HIGH) state; and providing means responsive to said $\overline{RAS}$ said $\overline{CAS}$, said $\overline{WE}$, said $\overline{XF/G}$ and said physical address for storing said data on said bit lines in said plurality of memory arrays at said physical address when said $\overline{XF/G}$ is in its second (HIGH) state and said $\overline{WE}$ is in its first (LOW) state.

8. A method according to claim 6 wherein said plurality of memory arrays comprise a plurality of memory banks having a plurality of bank select address inputs and further comprising the steps of:

selectively applying a predetermined number of said shifted logical row address bits to said bank select address inputs of said memory banks for addressing said memory banks.

9. A method according to claim 6 wherein said step of providing said shifted logical row address bits comprises the step of shifting said binary equivalent of said logical row address A places to the left where $2^A$ equals B and B equals the number of words in a row of the bit map for providing said predetermined number of shifted logical row address bits and said step of providing said shifted logical column address bits comprises the step of shifting said binary equivalent of said logical column address C places to the right where $2^C$ equals D and D equals the number of bits in each of said words for providing said predetermined number of shifted logical column address bits.

10. A method according to claim 6 comprising the steps of:

transferring bytes of each of said words from said buffer to a video data register means;

latching in response to an address applied thereto predetermined bits from said bytes into said video data register means; and transferring said predetermined bits from said video date register means to said video display.

11. A video system comprising:

a plurality of identical memory arrays, each of said memory arrays having a predetermined number of rows and columns, for storing a plurality of words, each of said words having a predetermined number of bits, wherein each of said arrays stores a predetermined bit from each of said words, said plurality of memory arrays having a plurality of physical row address inputs and a plurality of physical column address inputs;

means for providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

first means for storing a number corresponding to said number of bits in each of said memory arrays;

second means for storing a number corresponding to the total number of bits in said bit map;

first means coupled to said logical row and column address providing means which is responsive to the numbers stored in said first and second storing means for shifting said binary equivalent of said logical row address a predetermined number of places to the left for providing said physical row address comprising a predetermined number of shifted logical row address bits;

second means coupled to said logical row and column address providing means which is responsive to the numbers stored in said first and second storing means for shifting the binary equivalent of said logical column address a predetermined number of places to the right for providing a physical column address comprising a predetermined number of shifted logical column address bits;

means coupled to said first and second shifting means for selectively applying a predetermined number of said shifted logical row address bits and shifted logical column address bits to said physical row address inputs and said physical column address inputs of said plurality of memory arrays, respectively, for addressing simultaneously a bit of a physical address in each of said memory arrays;

a data/mask bus having a plurality of bit lines, a different one of said bit lines being coupled to each of said plurality of memory arrays;

means for providing a predetermined mask bit on a selected one of said bit lines;

means for selectively providing a row address strobe signal ($\overline{RAS}$), a first write enable control signal ($\overline{WE}$) and a transfer cycle control signal ($\overline{XF/G}$), said $\overline{XF/G}$, said $\overline{RAS}$ and said $\overline{WE}$ having a first (LOW) and a second (HIGH) state;

means responsive to said $\overline{RAS}$, said $\overline{WE}$ and said $\overline{XF/G}$ for storing said predetermined mask bit on said selected one of said bit lines in said memory array coupled thereto if said $\overline{XF/G}$ is in its second state (HIGH) and said $\overline{RAS}$ goes to its first (LOW) state when said $\overline{WE}$ is in its first (LOW) state;

means responsive to said predetermined mask bit stored in said memory array and said $\overline{WE}$ for providing a second write control signal $\overline{WE}$* when said $\overline{WE}$ goes to its low state after said storing of said predetermined mask bit in said memory array;

means for providing a predetermined data bit on said selected one of said bit lines after said storing of said predetermined mask bit in said memory array; and means responsive to said predetermined data bit on said selected one of said bit lines, said $\overline{WE}$* and said physical address for storing said predetermined data bit in said memory array at said physical address.

12. A video system comprising:

a plurality of identical memory arrays for storing a plurality of words, each of said memory arrays having a shift register and a predetermined number of rows and columns, for storing a plurality of words, each of said words having a predetermined number of bits, wherein each of said arrays stores a predetermined bit from each of said words, said plurality of memory arrays having a plurality of physical row address inputs and a plurality of physical column address inputs;

means for providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

first means for storing a number corresponding to said number of bits in each of said memory arrays;

second means for storing a number corresponding to the total number of bits in said bit map;

first means coupled to said logical row and column address providing means which is responsive to the numbers stored in said first and second storing means for shifting said binary equivalent of said logical row address a predetermined number of places to the left for providing a row of physical address (RAD) comprising said physical row address comprising a predetermined number of shifted logical row address bits;

second means coupled to said logical row and column address providing means which is responsive to the numbers stored in said first and second storing means for shifting the binary equivalent of said logical column address a predetermined number of places to the right for providing a column address (CAD) comprising a predetermined number of shifted logical column address bits;

means coupled to said first and second shifting means for selectively applying a predetermined number of said shifted logical row address bits and shifted logical column address bits to said physical row address inputs and said physical column address inputs of said plurality of memory arrays, respectively, for addressing simultaneously a bit at a physical address in each of said memory arrays;

means for providing a transfer cycle control signal ($\overline{XF/G}$), a row address strobe ($\overline{RAS}$), a column address strobe ($\overline{CAS}$) and a video strobe (VSTB), said $\overline{XF/G}$, said $\overline{RAS}$ and said $\overline{CAS}$ each having a first (LOW) and a second (HIGH) state;

means responsive to said $\overline{XF/G}$, said RAD and said $\overline{RAS}$ for transferring a row of data in each of said plurality of memory arrays which is identified by said RAD to said shift register in said array if said $\overline{XF/G}$ is in its first (LOW) state when said $\overline{RAS}$ goes to its first (LOW) state;

means responsive to said CAD for identifying the first word in said shift register which contains bits to be displayed; and means responsive to said VSTB for transferring a bit of data out of each of said shift registers beginning with said first word.

13. A system according to claim 12 comprising a system clock (SYSCLK) and wherein said VSTB comprises a frequency which is one half the frequency of said SYSCLK.

14. A system according to claim 12 comprising:

a video data assembly first-in, first-out memory circuit (VDAF);

means responsive to the generation of said $\overline{XF/G}$ and said $\overline{RAS}$ for providing a start bit strobe control signal SBSTB at the beginning of the first byte of data containing a pixel to be displayed if said $\overline{XF/G}$ is in its first (LOW) state when said $\overline{RAS}$ goes to its first (LOW) state, said SBSTB becoming inactive when said $\overline{CAS}$ goes to its first (LOW) state;

means for providing a data strobe (DSTB);

means responsive to said SBSTB and said DSTB for latching selected bits shifted out of each of said shift registers into said VDAF;

means for providing a first signal (CDAT A) corresponding to the position of the first bit to be displayed in the first byte transferred to said VDAF following said providing of said $\overline{XF/G}$;

means for providing a second signal (CDAT B) corresponding to the number of bits to be displayed in each subsequent word transferred to said VDAF after said first word;

means responsive to said SBSTB for latching said first word, and said CDAT A into said VDAF; and means responsive to said DSTB for latching said subsequent words and said CDAT B into said VDAF.

15. A system according to claim 10 comprising:

means for providing a VDAF full control signal ($\overline{FULL}$) whenever said VDAF is full; and means for responsive to said $\overline{FULL}$ for interrupting the generation of said VSTB, said SBSTB and said DSTB.

16. In a video system comprising:

a plurality of identical memory arrays for storing a plurality of words, each of said words having a predetermined number of bits, each of said memory arrays having a predetermined number of rows and columns and a predetermined bit from each of said words, said plurality of memory arrays having a plurality of physical row address inputs and a plurality of physical column address inputs, a method of transferring data in said system comprising the steps of:

providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

storing a number corresponding to said number of bits in each of said memory arrays;

storing a number corresponding to the total number of bits in said bit map;

shifting in response to the numbers stored in said first and second storing means said binary equivalent of said logical row address a predetermined number of places to the left for providing a predetermined number of shifted logical row address bits;

shifting in response to the numbers stored in said first and second storing means the binary equivalent of said logical column address a predetermined number of places to the right for providing a predetermined number of shifted logical column address bits;

selectively applying a predetermined number of said shifted logical row address bits and shifted logical column address bits to said physical row address inputs and said physical column address inputs of said plurality of memory arrays, respectively, for addressing simultaneously a bit at a physical address in each of said memory arrays;

providing a data/mask bus having a plurality of bit lines, a different one of said bit lines being coupled to each of said plurality of memory arrays;

providing a predetermined mask bit on a selected one of said bit lines;

selectively providing a row address strobe signal ($\overline{RAS}$), a first write enable control signal ($\overline{WE}$) and a transfer cycle control signal ($\overline{XF/G}$), said $\overline{XF/G}$, said $\overline{RAS}$ and said $\overline{WE}$ having a first (LOW) and a second HIGH) state;

storing said predetermined mask bit on said selected one of said bit lines in said memory array coupled thereto if said $\overline{XF/G}$ is in its second stat. (HIGH) and said $\overline{RAS}$ goes to its first (LOW) state when said $\overline{WE}$ is in its first (LOW) state;

providing a second write control signal $\overline{WE}$* when said $\overline{WE}$ goes to its low state after said storing of said predetermined mask bit in said memory array;

providing a predetermined data bit on said selected one of said bit lines after said storing of said predetermined mask bit in said memory array; and storing in response to said second write control signal $\overline{WE}$* said predetermined data bit in said memory array at said physical address.

17. In a video system comprising:

a plurality of identical memory arrays, each of said memory arrays having a shift register and a predetermined number of rows and columns, for storing a plurality of words, each of said words having a predetermined number of bits, wherein each of said arrays stores a predetermined bit from each of said words, said plurality of memory arrays having a plurality of physical row address inputs and a plurality of physical column address inputs, a method of transferring data in said system comprising the steps of:

providing the binary equivalent of a logical row address and a logical column address for each word in a bit map, said bit map comprising a plurality of words in a plurality of rows and columns, the number of bits in each of said words, the number of bits in each row and column of said bit map and the number of bits in each row and column of said memory arrays being equal to a power of 2;

storing a number corresponding to said number of bits in each of said memory arrays;

storing a number corresponding to the total number of bits in said bit map;

shifting in response to the numbers stored in said first and second storing means said binary equivalent of said logical row address a predetermined number of places to the left for providing a row physical address (RAD) comprising a predetermined number of shifted logical row address bits;

shifting in response to the numbers stored in said first and second storing means the binary equivalent of said logical column address a predetermined number of places to the right for providing a column physical address (CAD) comprising a predetermined number of shifted logical column address bits, said CAD and said RAD identifying the location in said memory arrays of a first pixel to be displayed on a video monitor;

selectively applying a predetermined number of said shifted logical row address bits and shifted logical column address bits to said physical row address inputs and said physical column address inputs of said plurality of memory arrays, respectively, for addressing simultaneously a bit at a physical address in each of said memory arrays;

providing a transfer cycle control signal ($\overline{XF/G}$), a a row address strobe ($\overline{RAS}$), a column address strobe ($\overline{CAS}$) and a video strobe (VSTB), said $\overline{XF/G}$, said $\overline{RAS}$ and said $\overline{CAS}$ each having a first (LOW) and a second (HIGH) state;

transferring in response to said $\overline{XF/G}$, said RAD and said $\overline{RAS}$ a row of data in each of said plurality of memory arrays which is identified by said RAD to the shift register in said array if said $\overline{XF/G}$ is in its first (LOW) state when said $\overline{RAS}$ goes to its first (LOW) state;

identifying in response to said CAD the first word in said shift register which contains bits to be displayed; and transferring in response to said VSTB a bit of data out of each of said shift registers beginning with said first word.

18. A method according to claim 17 comprising a system clock (SYSCLK) and wherein said VSTB comprises a frequency which is one half the frequency of said SYSCLK.

19. A method according to claim 17 comprising the steps of:

providing a video data assembly first-in, first-out memory circuit (VDAF):

providing in response to said $\overline{XF/G}$ and said $\overline{RAS}$ for providing a start bit strobe control signal SBSTB at the beginning of the first byte of data containing a pixel to be displayed if said $\overline{XF/G}$ is in its first (LOW) state when said $\overline{RAS}$ goes to its first (LOW) state, said SBSTB becoming inactive when said $\overline{CAS}$ goes to its first (LOW) state;

providing a data strobe (DSTB);

latching in response to said SBSTB and said DSTB selected bits shifted out of each of said shift registers into said VDAF;

providing a first signal (CDAT A) corresponding to the position of the first bit to be displayed in the first byte transferred to said VDAF following said providing of said $\overline{XF/G}$;

providing a second signal (CDAT B) corresponding to the number of bits to be displayed in each subsequent word transferred to said VDAF after said first word;

latching in response to said SBSTB said first word, and said CDAT A into said VDAF; and latching in response to said DSTB said subsequent words and said CDAT B into said VDAF.

20. A system according to claim 17 comprising the steps of:

providing a VDAF full control signal ($\overline{FULL}$) whenever said VDAF is full; and interrupting in response to said $\overline{FULL}$ the generation of said VSTB, said SBSTB and said DSTB.

* * * * *